Figure 1:
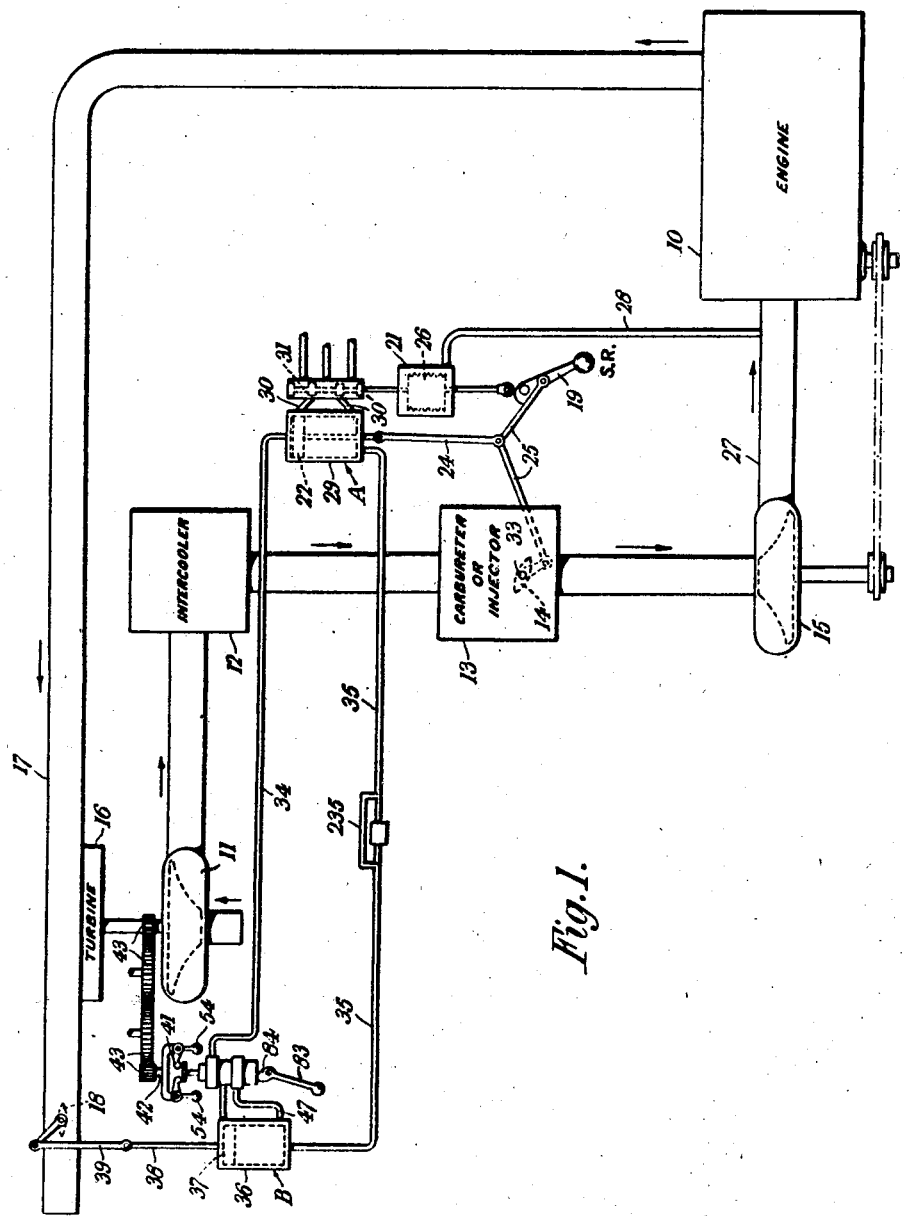

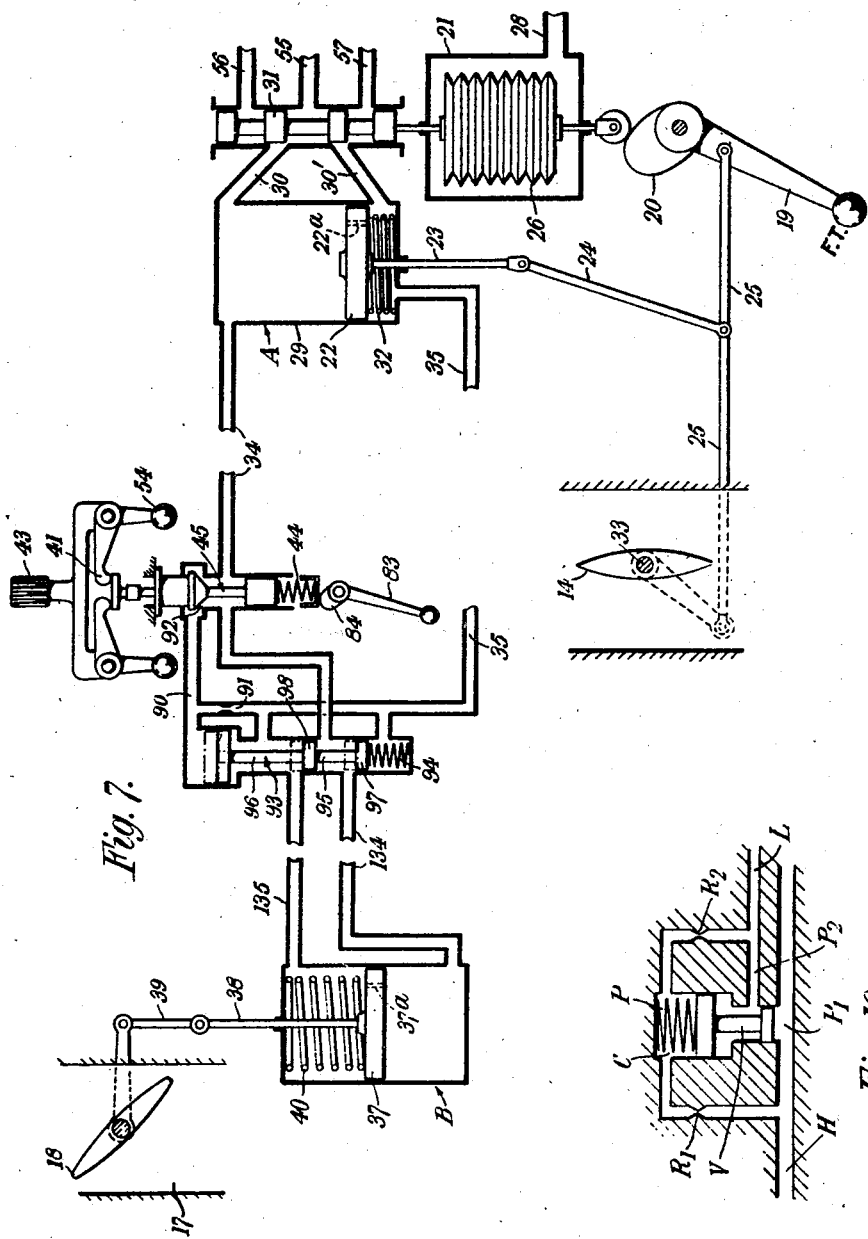

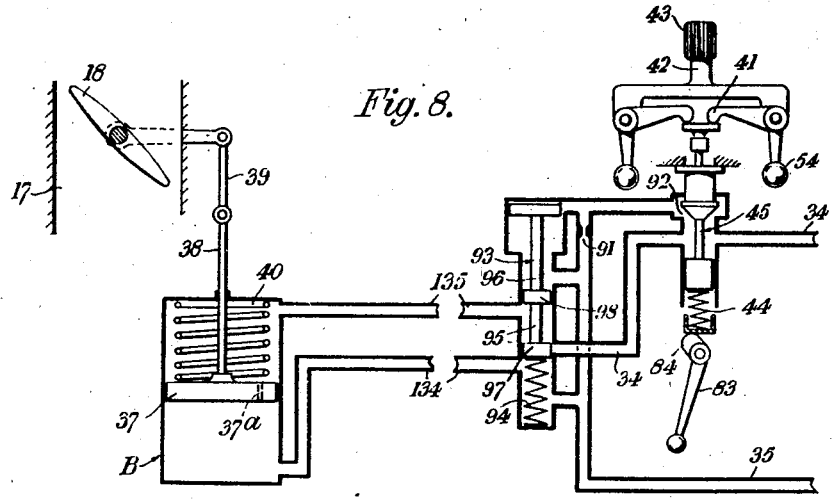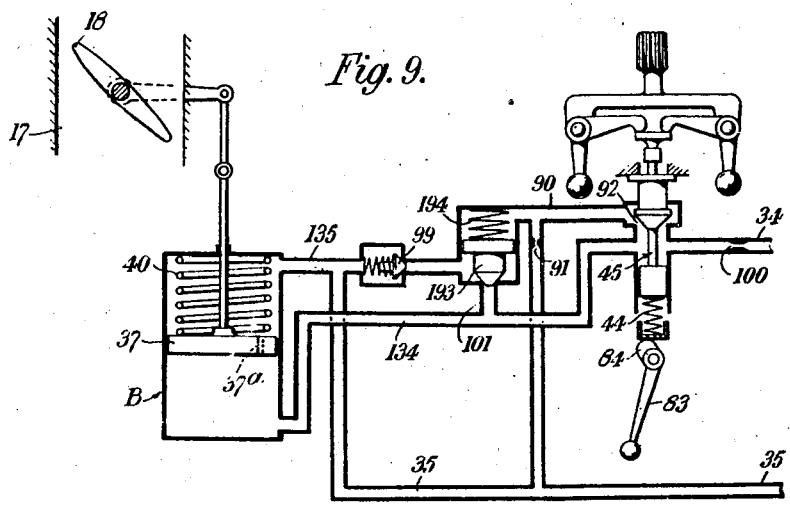

Patented July 1, 1947

2,423,417

UNITED STATES PATENT OFFICE 2,423,417

EXHAUST-DRIVEN SUPERCHARGER FOR INTERNAL-COMBUSTION ENGINES

Philip Harold Stokes and Leonard Sidney Greenland, Coventry, and Cyril Alphonso Pugh, Ilford, England; said Stokes and said Greenland assignors to H. M. Hobson Limited, a company of Great Britain, and said Pugh assignor to The Plessey Company Limited, Ilford, England, a company of Great Britain Application July 7, 1943, Serial No. 493,720
In Great Britain September 14, 1942

10 Claims. (Cl. 60—13)

With aircraft engines fitted with exhaust driven turbo-superchargers, as height is gained and the supercharger pressure maintained, the decrease in the air pressure against the outlet of the exhaust system causes the speed of the turbine to increase due to the increasing pressure difference across it. This is of course an advantage in that it enables the supercharger, as the altitude increases, to deliver a greater volume of air to the engine and so to compensate for the decreasing density of the air. There comes a limit however beyond which the speed of revolution of the turbine becomes excessive and likely to cause the structure to fail. It is an object of the present invention to prevent the development of such excessive speeds at high altitudes.

In United States Patent No. 2,355,759, issued August 15, 1944, is described an arrangement in which excessive speed of rotation of an exhaust-gas-operated turbine for driving a supercharger fitted to an aircraft engine is prevented by an altitude-responsive-device which is inoperative when the altitude is below a give limit, but is effective to prevent further increase in the speed of rotation of the turbine when the altitude increases beyond the limit.

The present invention provides, in combination with an aircraft engine and a supercharger driven by an exhaust-gas-operated turbine, a control device for supplying a progressively increasing flow of exhaust gas to the turbine with increase in altitude, and a governor which, when the speed of the turbine reaches a given critical limit, operates to override the control device, and so prevents the turbine from exceeding the critical speed. In place of a turbine we may employ equivalent exhaust-gas-operated prime movers for driving the supercharger.

In one arrangement according to the invention, the flow of exhaust gas to the turbine is controlled by a valve operated by a boost control device (preferably of the variable datum type) which, so long as the altitude remains below the critical height, i. e. the height at which the turbine attains its critical speed, actuates the valve so as progressively to increase the flow of exhaust gas to the turbine with increasing altitude, the governor being arranged to override the boost control device, when the critical height is reached (or should the turbine attain its critical speed accidentally), and control the valve so as to prevent overspeeding of the turbine.

In the preferred form of the invention, an engine driven supercharger is also provided, and the boost control device is arranged to operate two servomotors, connected in parallel with respect to it and one controlling the position of the throttle valve and the other the position of the exhaust gas valve associated with the turbine, the second servomotor being biassed so that, below the full throttle height (i. e. the maximum height up to which the engine driven supercharger can maintain the selected boost) very little exhaust gas is supplied to the turbine, but serving between the full throttle and critical heights to operate the exhaust gas valve so as progressively to increase the supply of exhaust gas to the turbine with increase in altitude.

With this arrangement the throttle valve will maintain under the control of the first servomotor, a pre-selected boost pressure, supplied by the engine driven supercharger, up to the full throttle height, the turbo-driven supercharger being inoperative under these conditions. When the full throttle height is exceeded, however, the second servomotor will operate the exhaust-gas-valve so that the turbo-driven supercharger will be brought into operation to assist in maintaining the pre-selected boost pressure, the speed of rotation of the turbine gradually increasing as the altitude increases. When the turbine reaches its critical speed the governor will operate to prevent increase in the speed of rotation of the turbine beyond this critical value. Automatic regulation of engine performance on a turbo-supercharger installation, controllable by a single pilot's throttle lever at all heights at which the aeroplane can be flown, may thus be obtained.

The invention includes an especially sensitive arrangement in which, when the turbine reaches its critical speed, a relief valve indirectly controlled by the governor operates to reduce the pressure difference acting on the servo piston of the second servomotor in opposition to its spring, and in which a large movement of the relief valve is produced by a very small movement of the governor.

To this end the relief valve is exposed at one end to the pressure prevailing between two restrictions in a by-pass pipe connecting the pressure lines leading to the high pressure and low pressure ends of the servo cylinder, the relief valve being normally held by this pressure in an inoperative position. One of the restrictions is controlled by a valve linked to the governor and operating, when the critical speed is reached, to vary the size of said restriction and thereby permit the relief valve to move into an operative position in which it reduces the pressure difference acting on the servo piston in opposition to its spring.

The pressure between the restrictions in the by-pass will be intermediate between the pressure in the high and low pressure lines, the sizes of the restrictions being critical for determining the pressure between them. By keeping one restriction fixed, and using the governor to vary the other, an extremely sensitive arrangement is obtained and a large movement of the relief valve can be produced by small movement of the governor. The restrictions act as a "hydraulic potentiometer" permitting a desired pressure intermediate between the pressures prevailing in the high and low pressure lines to be applied to the end of the relief valve.

It is preferred to arrange for the governor-operated valve to reduce the pressure between the restrictions in the by-pass when the governor comes into operation. In the case when the governor-operated valve controls the restriction nearest the high pressure line, this valve must then be arranged to reduce the size of the restriction when the governor comes into operation. The reverse arrangement is required if the governor-operated valve controls the other restriction, as the restriction must be enlarged to produce the required fall of pressure on the end of the relief valve.

Figure 2:
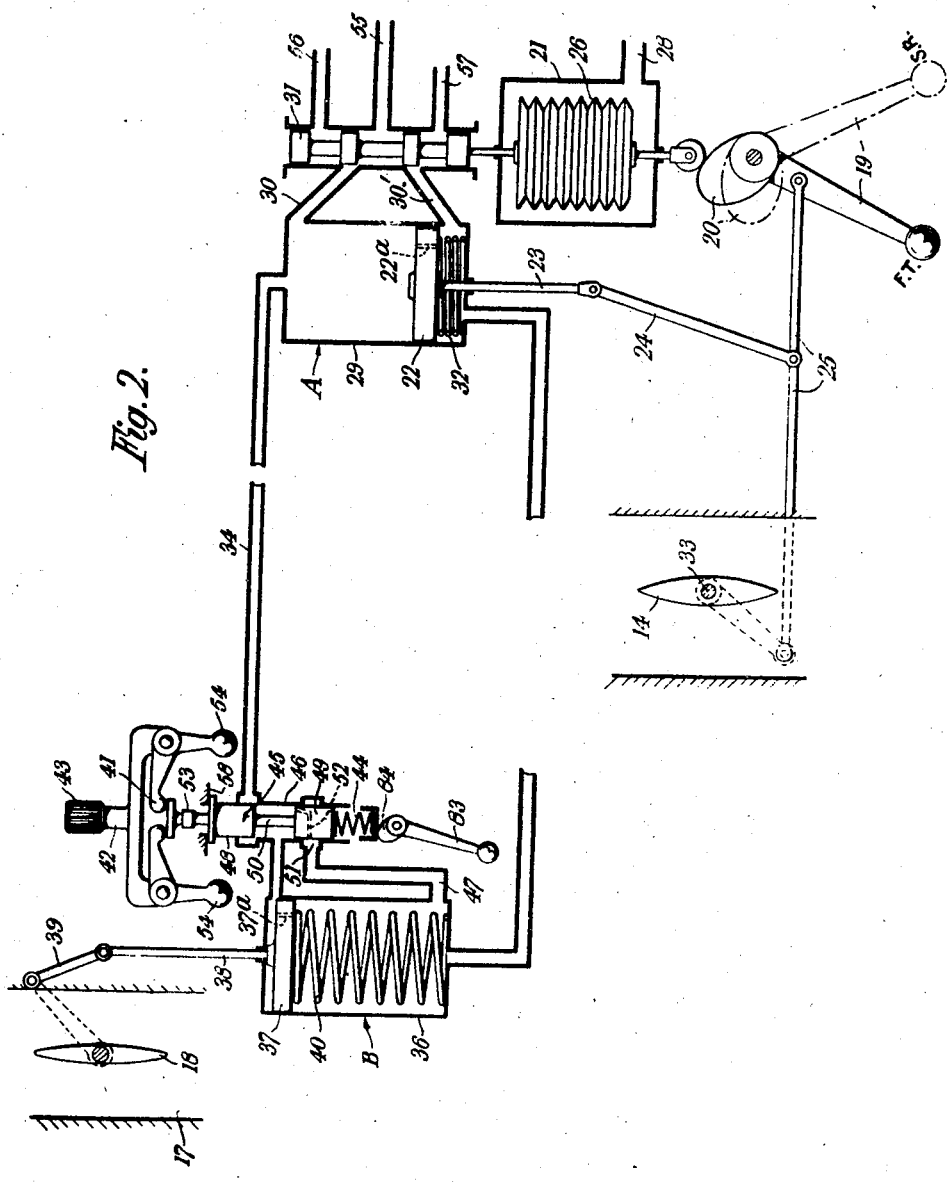
Figure 3:
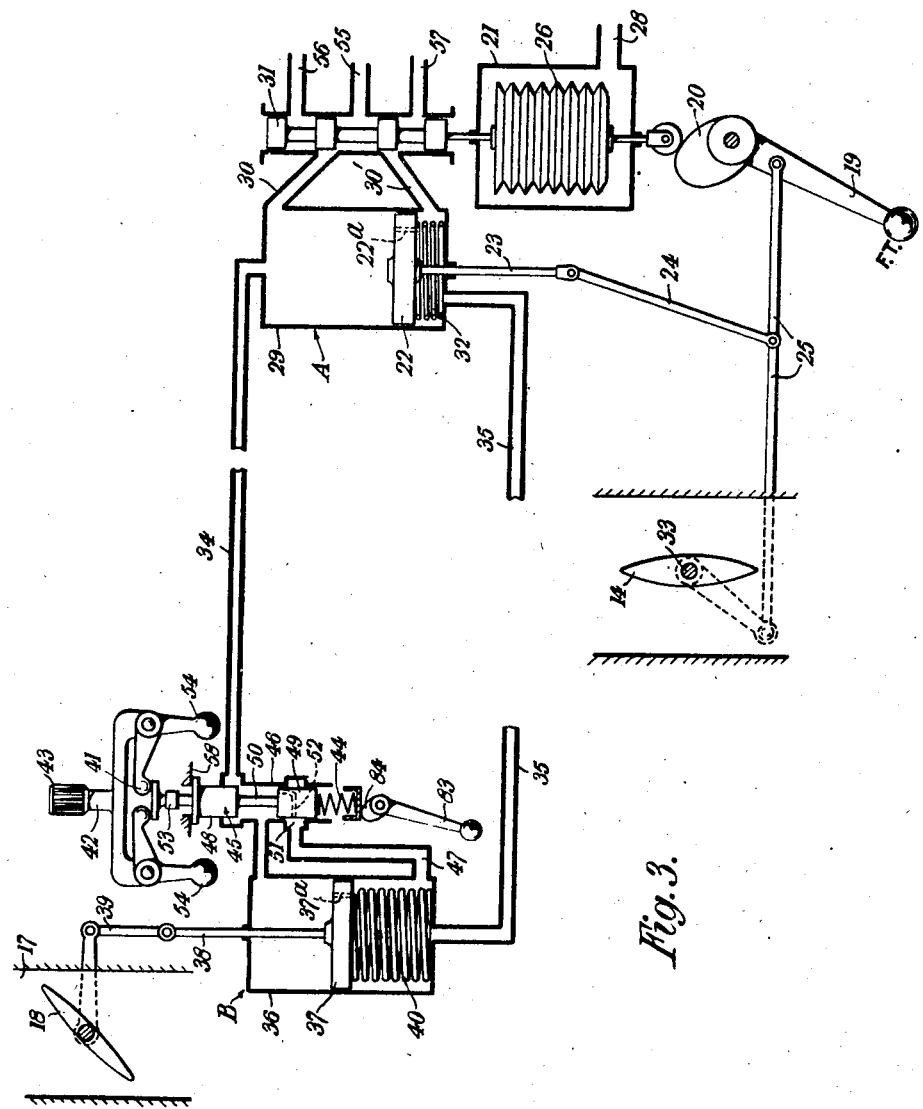
Figure 4:
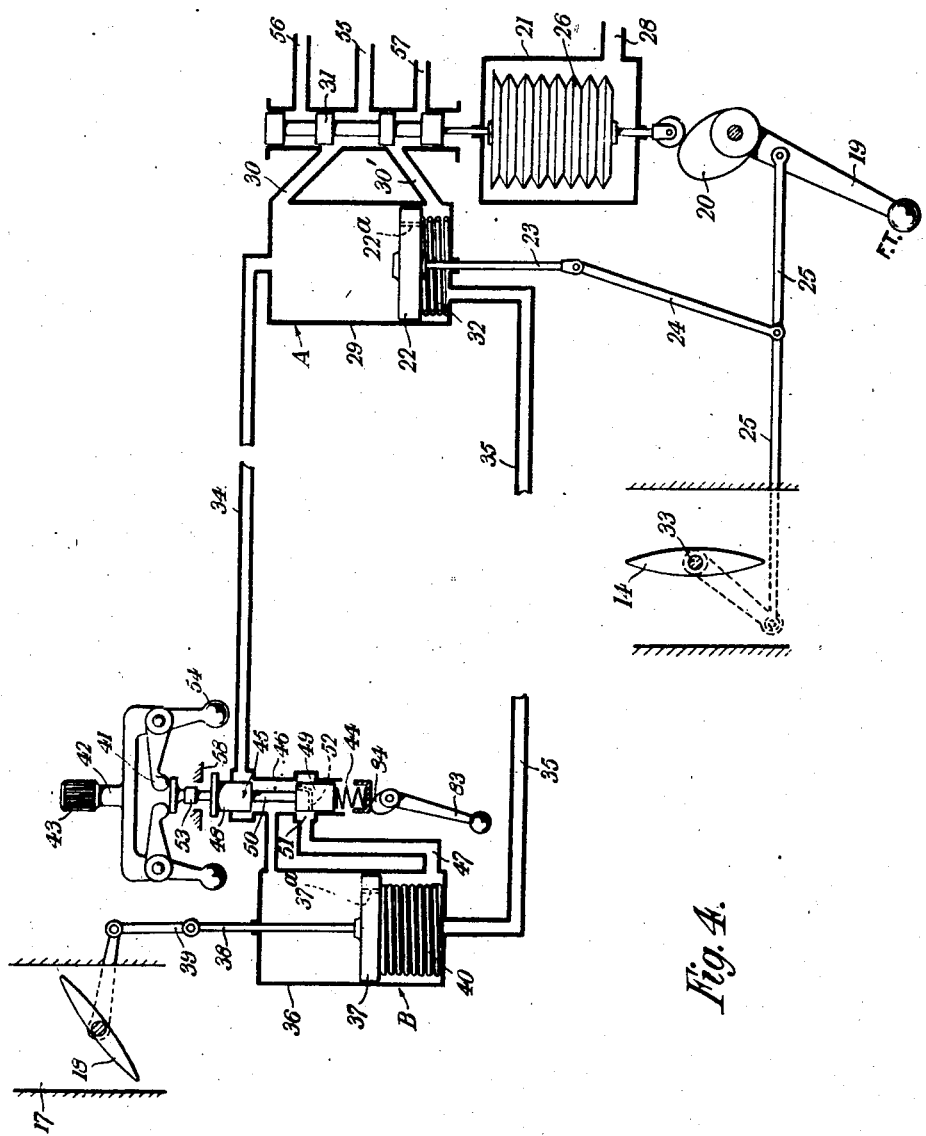
Figure 5:
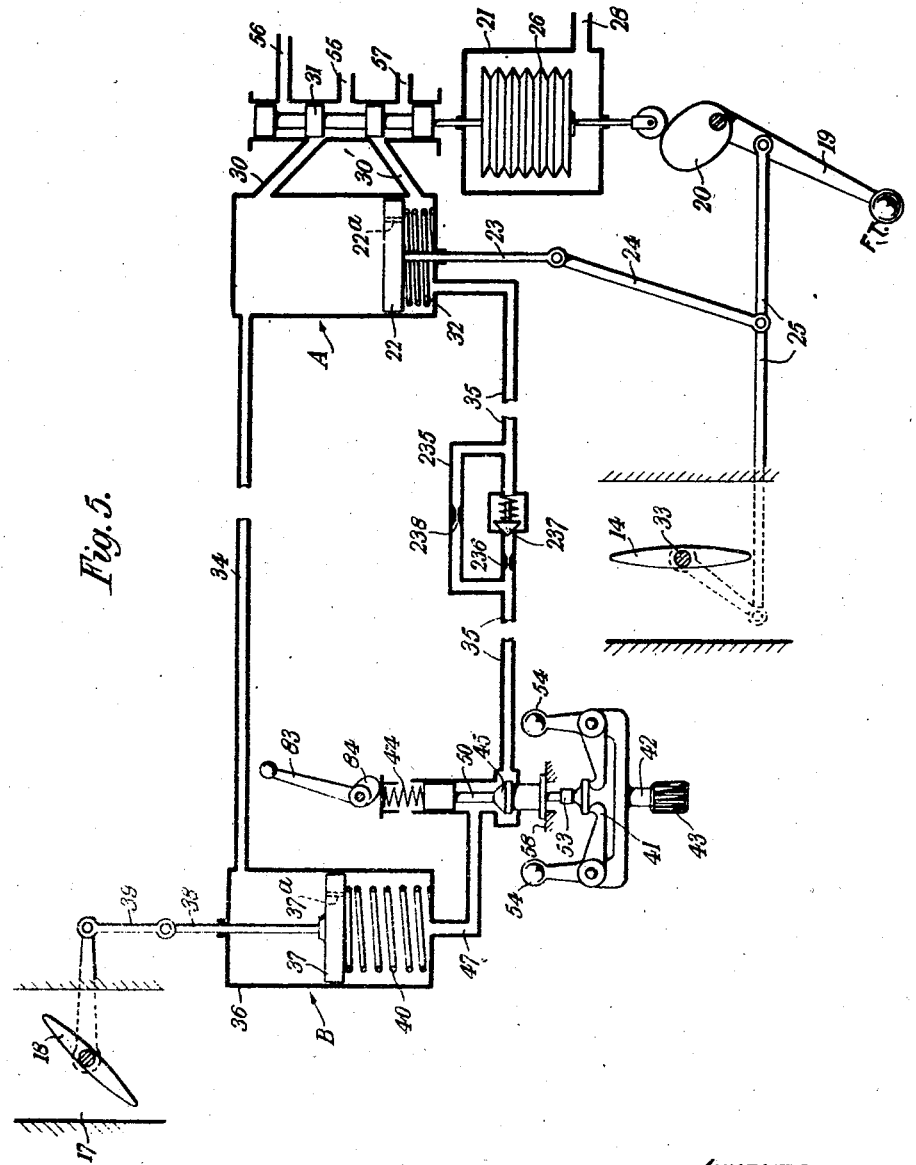
Figure 6:
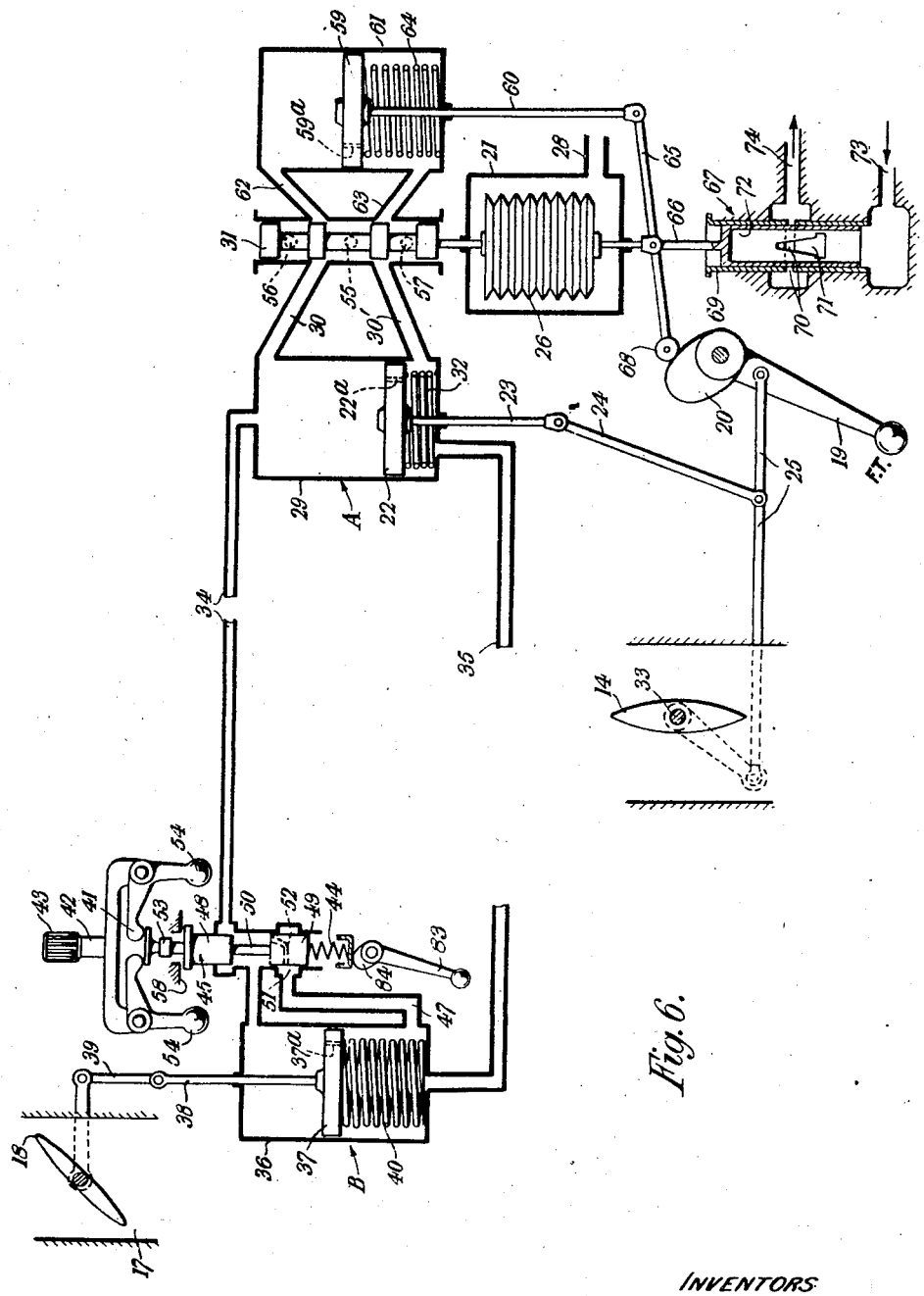

Various forms of turbo supercharger installation according to the invention will now be described in greater detail, by way of example, with reference to the accompanying drawings, in which, Fig. 1 is a diagrammatic layout of the first installation, showing the parts in the position they occupy at ground level and at slow running (S. R.), Fig. 2 is an enlarged diagrammatic sectional view showing the boost control, associated servomotors, throttle valve, exhaust gas valve, governor and associated relief valve, in the positions they occupy at the full throttle height with the pilot's throttle lever in the full power position (F. T.), Fig. 3 is a view similar to Fig. 2, showing the position of the parts between full throttle height and critical height, Fig. 4 is a similar view showing the position of the parts at the critical height, the governor just having come into operation, Fig. 5 is a similar view showing a modified form of governor and with the parts in the position they occupy between the full throttle height and critical height, Fig. 6 is a similar view showing an alternative arrangement including a resetting piston for the fuel supply, the parts being shown in the position they occupy above the critical height, Figs. 7 and 8 are similar views showing an arrangement in which overspeeding of the turbine is prevented by a relief valve indirectly controlled by the governor, the parts in each case being shown in the position they occupy between the full throttle height and critical height, and Fig. 8 illustrating the effect of reversing the pressure connections, Fig. 9 is a similar view showing an alternative arrangement employing an indirectly controlled relief valve, the parts again being shown in the position they occupy between the full throttle height and the critical height, and Fig. 10 is a diagram explaining the operation of the indirectly controlled relief valves of Figs. 7 and 8 or 9.

Like reference characters indicate like parts throughout the figures.

Referring first of all to Fig. 1, the air admitted to the engine 10 passes first through an exhaust driven turbosupercharger 11, then through an intercooler 12, then through the carburetter or injector 13, past the throttle valve 14 and finally through an engine driven supercharger 15. The exhaust gas traverses the turbine 16 which is placed to one side of the exhaust pipe 17. A gate valve 18, hereinafter referred to as the waste gate, located in the exhaust pipe 17 beyond the turbine 16 controls the quantity of exhaust gas supplied to the turbine. When the waste gate 18 is open, most of the exhaust gas is spilled through it and very little traverses the turbine 16, and as the waste gate is gradually closed, more and more exhaust gas is fed to the turbine 16.

The pilot's throttle lever 19, which is movable between the slow-running position S. R. and the full power position F. T. indicated in Fig. 2, carries the controlling cam 20 of a variable datum boost control device 21 of the kind described in British Patent No. 419,113. This contains a capsule stack 26 located in a chamber to which the boost pressure is communicated from the induction pipe 27 by a pipe 28, and is associated with a servomotor A, the servo piston 22 of which is fixed to a piston rod 23 joined by a link 24 to a broken link 25 connecting the pilot's lever 19 and the throttle valve 14. The shape of the controlling cam 20 determines the relationship between the position of the pilot's lever 19 and the boost pressure developed.

The upper and lower ends of the servo cylinder 29 are connected by pipes 34, 35 to the upper and lower ends of the servo cylinder 36 of a remote servomotor B. The two servomotors A and B are thus connected in parallel with respect to the boost control device. The cylinder 36 contains a servo piston 37 the piston rod 38 of which is connected by a link 39 to the waste gate 18. The pipes 34, 35 apply to the piston 37 in the remote servo cylinder 36 the same pressure difference as that prevailing on the piston 22. Compression springs 40, 32 oppose downward movement of the servo pistons 37, 22 in their respective cylinders, but the spring 40 is stronger than the spring 32 and is consequently able to resist the oil pressure load so long as the first servo piston 22 is floating, thus maintaining the remote servo piston 37 against the top of its cylinder 36 (see Fig. 2) and so holding the waste gate 18 wide open.

The capsule stack 26 of the boost control device is coupled to a relay valve 31 controlling a pressure inlet 55 and exhaust outlets 56, 57. Normally the relay valve 31 is maintained in the sensitive position shown in Fig. 2, in which a small quantity of pressure oil is admitted from the inlet 55 to pipes 30, 34 leading to the upper ends of the cylinders 29, 36 of the servomotors A and B respectively. This oil circulates through small orifices 22ª, 37ª in the servo piston 22, 37 and back through pipes 35, 30' to an exhaust outlet 57. If the boost pressure falls, the capsules 26 expand, lifting the relay valve 31 to admit sufficient pressure oil from the inlet 55 to move the piston 22 down against the action of its spring 32, expelling the oil beneath it to exhaust through the pipe 30' and outlet 57; the throttle valve 14 is thus opened until the boost pressure is restored to the proper value and the capsules 26 restore the relay valve 31 to the sensitive position. The reverse action takes place in the event of a rise in boost pressure. The relay valve 31 will then be moved down, admitting pressure oil to the underside of the servo piston 22, which thereupon moves up, displacing oil to exhaust through the pipe 30 and outlet 56 and closing the throttle valve until the boost pressure is reduced to the proper value.

The pressure difference across the piston 22 is determined by the load on its spring 32 and the torque produced on the spindle 33 of the throttle valve 14 by the air flowing over the throttle valve. As the altitude increases, the piston 22 will tend to move downwards, so gradually increasing the maximum throttle opening, until finally it reaches the bottom of its cylinder 29 when the full throttle height is reached, as shown in Fig. 2.

Above the full throttle height the increased pressure rise across the servo pistons due to further increase in altitude causes the remote servo piston 37 to descend and gradually close the waste gate 18 (see Fig. 3). This causes the turbo-driven supercharger 11 to speed up gradually and so maintain the boost pressure at the desired value.

As shown in Fig. 5, the pipe 35 has in it a restriction 236 and a non-return valve 237 by-passed by a pipe 235 containing a restriction 238. These serve to give a measure of control over the movement of the waste gate 18, and permit of rapid acceleration of the engine, when required, without hunting of the waste gate. Owing to the long lengths of piping which the gases have to traverse, there may be a time lag in the response of the boost control capsule 26 to changes in setting of the waste gate 18. The latter may moreover tend, on movement of the pilot's lever, to move beyond the position required to establish the selected boost. The boost control would then, after an interval, operate to adjust the waste gate towards, but again beyond, the selected position. This might lead to hunting in case of rapid acceleration, but the restrictions 236, 238 and non-return valve 237 serve to damp out this tendency and ensure that if the waste gate should tend to move beyond the selected position, it will gradually return to it as distinct from oscillating about it.

The damping device could of course be included in the line 34 instead of in the line 35, but in this case the non-return valve would need to be reversed, since its function is to restrict the flow of liquid when the boost control seeks to counteract the effects of rapid acceleration.

When the turbine 16 reaches its critical speed, either owing to the critical height being attained or from some accidental cause, a governor 41 on a shaft 42 geared by gears 43 (Fig. 1) to the turbo-supercharger overcomes the pressure of a spring 44 associated with a relief valve 45 in the pipe line 34 connecting the high pressure ends of the servo cylinders 29, 36. The spring 44 normally holds the relay valve 45 against a stop 58 as indicated in Fig. 3. The governor 41 has an adjustable collar 53 which enables the governor weights 54 to be set to the required working radius.

The relief valve 45 is located in a barrel 46 communicating at its upper end with the high pressure pipe line 34 and communicating at its lower end with a pipe 47 connected to the low pressure pipe line 35. The valve 45 is in the form of a piston having two heads 48, 49 and a central waisted portion 50. Normally (see Fig. 3) the upper head 48 leaves a free passage for pressure oil along the high pressure pipe 34, while the lower head 49 blocks a port 51 leading from the barrel to the pipe 47. A leakage passage 52 in the lower head 49 allows a small quantity of pressure oil to spill to exhaust. When the turbine 37 attains its critical speed, the governor weights 54 will move out, as shown in Fig. 4, and the relief valve 45 will move down against the spring 44 to restrict the flow of oil to the top of the piston 37, and so prevent the latter from moving further down and closing the waste gate 18 any further. Overspeeding of the turbine is thus prevented, and as the waste gate has been unable to feed to the turbine the further quantity of exhaust gas required to re-establish the boost pressure, the relay valve 31 will remain lifted, as shown, and the relief valve 45 will remain in the depressed position.

If the aircraft continues to climb above the critical height, the fall in external atmospheric pressure tends to cause the turbine to overspeed, but at the same time the corresponding reduction in boost pressure tends to offset this effect, and may in some cases more than offset it.

If under these conditions the turbine should tend to overspeed, the governor will immediately overspeed, and the relief valve 45 will be moved further down to restrict the flow of oil to the upper side of the piston 37 thus enabling the spring 40 to lift the piston 37 and open the waste gate 18 sufficiently to counteract the tendency of the turbine to overspeed. The boost pressure will again be less than the selected value, so that the relay valve 31 will remain up and the relief valve 45 will remain in the new position to which it has been moved by the governor.

If, however, the turbine speed should tend to fall off under these conditions, the governor will allow the relief valve 45 to rise again, with the result that the pressure difference across the piston 37 will increase, so moving the piston down to close the waste gate 18, thus increasing the turbine speed until, either the boost pressure is restored, and the relay valve 31 returned to its sensitive position or the turbine again attains its critical speed and the governor therefore operates the relief valve 45 to arrest the downward movement of the piston 37 as described above.

If the turbine tends to overspeed rapidly, the relief valve 45 will be moved, on operation of the governor 41, sufficiently to close the high pressure pipe 34 altogether, and open the port 51 leading to the low pressure pipe 35, with the result that liquid can flow from the upper end of the remote servo cylinder 36 to the low pressure pipe via the waisted portion 50 of the relief valve. This allows of rapid movement of the servo piston 37 to open the waste gate 18 and reduce the turbine speed.

A continuous flow of warm oil from the engine through the system is ensured by the leakage orifices 22a, 37a and 52. These are shown greatly enlarged in the drawings for the sake of clarity. A lever 83 carrying a cam 84 is provided for adjusting the compression of the spring 44 associated with the relief valve 45.

For installations where rapid over-speeding of the exhaust gas turbine is not encountered, the simpler form of governor shown in Fig. 5 can be used. In this case the relief valve 45 is located in the low pressure pipe 35 and is arranged to restrict the flow of oil through the pipe when moved by the governor 41 against its spring 44. This reduces the pressure difference across the servo piston 37 coupled to the waste gate 18, and arrests its further downward movement. In cases where it is necessary, in order to prevent overspeeding of the turbine, for the spring 40 to raise the piston 37 and open the waste gate 18, the oil displaced by the piston 37 can flow to its underside through the orifice 37a in the piston.

As an alternative to the arrangement shown in Fig. 5, the relief valve 45 may be disposed in the high pressure pipe 34. In this case closure of the relief valve 45 by the governor 41 restricts the flow of oil to the top of the piston 37 and so reduces the pressure difference across it.

The apparatus according to the invention may be used in association with a carburetter or fuel injection system having a resetting piston for adjusting the fuel flow after the second servo piston 37 has moved down in its cylinder to the limit permitted by the governor 41, i. e. when the critical height is reached. Such an arrangement is shown in Fig. 6.

The resetting piston 59 is located in a cylinder 61 and is normally maintained at the top of the cylinder by a spring 64, which is stronger than the spring 40 and is consequently able to resist the oil pressure load, supplied from the relay valve through the pipe 62, so long as the servo piston 37 of the servo motor B is able to move downwards. When, however, the boost pressure begins to fall off, either as a result of the critical height being reached, and the governor having moved the relief valve 45 down so as to reduce the pressure difference across the piston 37 and thus prevent further downward movement thereof, or owing to the piston 37 having reached the bottom of the cylinder (should this occur before the critical height is reached) the oil pressure above the resetting piston 59 builds up sufficiently to overcome the spring 64 and move the resetting piston down, the oil beneath it flowing to exhaust through a pipe 63. The resetting piston, like the other pistons, is formed with a leakage orifice 59ª.

The piston rod 60 of the resetting piston is pivoted to one end of a cross link 65. This is pivoted centrally to a rod 66 connecting the capsule stack 26 of the boost control device and a fuel-metering valve 67. At its other end the cross link 65 carries a tappet 68 cooperating with the variable datum cam 20 on the pilot's lever 19.

The fuel metering valve 67 comprises a split outer sleeve 69 formed with a circumferential slot 70, which cooperates with a triangular port 71 in an inner sleeve 72, fixed to the rod 66, to form a metering orifice of variable area for fuel supplied to the valve through a conduit 73 and withdrawn through a conduit 74. It will be appreciated that the rate of flow of fuel through the metering valve will depend on the relative positions of the sleeves 69, 72, the metering orifice being progressively increased in area, by unmasking of the port 71, as the inner sleeve 72 is raised relatively to the outer sleeve 69.

So long as the selected boost pressure is maintained the resetting piston 59 will be at the top of its cylinder, and adjustment of the pilot's lever 19 to different positions between the slow running and full throttle positions will cause the cross link 65 to pivot about its right hand end (as seen in Fig. 6) thus raising or lowering the rod 66 to change the datum of the boost control device 21 and effect the adjustment of the fuel metering valve 67 appropriate to the change in boost pressure so produced. Movement of the pilot's lever 19 towards the full throttle position will raise the rod 66 to increase the boost pressure and also to increase the rate of flow of fuel through the valve 67, while movement of the pilot's lever 19 towards the slow running position will have the reverse effect.

When however the turbo-supercharger is no longer able to maintain the selected boost, the resetting piston 59 will descend in its cylinder. The cross link 65 will now pivot about its left hand end, so resetting the capsule stack 26 in accordance with the reduced boost pressure and returning the relay valve 31 to the sensitive position. At the same time the inner sleeve 72 of the valve 67 will be moved downwards to effect a corresponding reduction in area of the fuel metering orifice.

Correct sequencing of the three pistons 59, 37, 22 in the event of downward movement of the relay valve 31, as for example when the aircraft descends to a lower altitude than that at which the parts assume the position shown in Fig. 6, is ensured by the relative strength of the springs 64, 40, 32; i. e. the resetting piston 59 will return to the top of its cylinder before the waste gate piston 39 begins to move up, and the throttle piston 22 will only begin to move up after the piston 37 has reached the top of its cylinder. If, in the position shown in Fig. 6, the pilot moves his lever 19 to select a lower boost, the spring 64 will first of all raise the resetting piston 59, the cross link 65 rocking about its central pivotal connection to the rod 66 and oil being displaced from the top to the bottom of the resetting piston through the orifice 59ª. If conditions are such that the pressure in the chamber of the boost control device 21 exceeds the newly selected boost pressure, the relay valve 31 will move down, but only after the resetting piston 59 has reached the top of its cylinder, so admitting pressure oil to the pipe line 35 and permitting the spring 40 to raise the waste gate piston 37 until the boost pressure has dropped to the value required to restore the relay valve 31 to the sensitive position.

In the arrangements so far described the governor operates to override the boost control device, when the turbine reaches its critical speed, by operating a relief valve 45 under the direct control of the governor. In the arrangements shown in Figs. 7–9, the relief valve is indirectly controlled by the governor. This provides a more sensitive arrangement in which a large movement of the relief valve is produced by a very small movement of the governor.

The principle on which the indirectly operated relief valve depends will be understood from the diagram in Fig. 10. Here H is a high pressure line at pressure $P_1$, and L is a low pressure line at pressure $P_2$. A valve V controlling communication between the lines H, L, is exposed at its upper end to the pressure P in a chamber C situated in a by-pass connection between the lines H, L and containing two restrictions $R_1$, $R_2$ one on each side of the chamber C.

The pressure P consequently lies between $P_1$ and $P_2$, being determined by the equation $P = \lambda P_1 + \mu P_2$ where the coefficients $\lambda$ and $\mu$ depend only upon the relative adjustment of the restrictions $R_1$, $R_2$. When $R_1$ is wide open and $R_2$ nearly closed, P is nearly equal to $P_1$. When $R_2$ is wide open and $R_1$ is nearly closed, P is nearly equal to $P_2$. If, therefore $R_2$ is kept fixed the valve V may be caused to move up and down by closing or opening $R_1$. This gives a very sensitive control of the position of the valve V, the two restrictions acting as a kind of hydraulic potentiometer.

This principle is applied to the turbo-supercharger installation, in the arrangements shown in Figs. 7 to 9, by using a valve corresponding to V as the relief valve for overriding the boost control device, by keeping one of the restrictions $R_1$, $R_2$ fixed and varying the other by movement of the relief valve 45 directly controlled by the governor.

Referring now to Figs. 7 and 8, 90 is the by-pass connecting the high pressure line 34 with the low pressure line 35, 91 is the fixed restriction in the by-pass and 92 the variable restriction which is controlled by the relief valve 45 linked to the governor. The indirectly controlled relief valve 93 is exposed at its upper end to the pressure in the by-pass 90 between the restrictions 91, 92 and is normally maintained in the position shown by this pressure, operating against a spring 94 which acts on the lower end of the valve.

In the position illustrated, the high pressure line 34 communicates by means of the lower waisted portion 95 of the valve 93 with a line 134 leading to the undersurface of the waste gate piston 37, while the upper surface of the waste gate piston is exposed to the low pressure in the line 35 through the upper waisted portion 96 of the valve 93 and the line 135. It will be observed that in this arrangement the waste gate piston 37 is reversed as compared with those previously described, in that upward movement of the piston 37 against its spring 40 closes the waste gate 18 while downward movement of the piston 37 opens the waste gate.

When the governor comes into operation and moves the relief valve 45 down, as previously described, the consequent reduction in the pressure acting on top of the relief valve 93 enables the spring 94 to lift the valve 93 into the position shown in chain-dotted lines. As previously explained a very small movement of the relief valve 45 will, by its effect on the restriction 92, produce a large movement of the valve 93. In the chain-dotted position the line 135 leading to the upper surface of the piston 37 is practically closed by the land 98 of the valve and the line 134 leading to the lower surface of the piston 37 is practically closed by the land 97 of the valve. This regulates the fluid pressure difference across the piston 37 and enables the spring 40 to move it in the direction to open the waste gate and prevent overspeeding of the turbine.

In the event of reversal of pressure as between the high and low pressure lines 34, 35, the relief valve 93 will move into the position shown in Fig. 8, in which the land 97 interrupts communication between the lines 34, 134, and the land 98 interrupts communication between the lines 35, 135. This enables the spring 40 to move the piston 37 in the direction to open the waste gate and reduce the boost to the required value.

In the arrangement shown in Fig. 9, a simpler type of indirectly operated relief valve 193 is shown. This is exposed at its upper end to the pressure prevailing in the by-pass 90 between the fixed and variable restrictions 91, 92 and to the pressure of a spring 194, while its reduced lower end is exposed to the pressure in the high pressure line 134. When the governor operates to reduce the area of the restriction 92, the valve 93 moves up, so opening a relief connection 101 and allowing high pressure oil to flow from beneath the piston 37 to the low pressure line 135. The spring 40 is therefore able to move the piston 37 slowly down to open the waste gate and prevent overspeeding of the turbine. A bleed 100 is provided in the high pressure line 34, to avoid excessive flow when the relief valve 193 opens. A non-return valve 99 is included in the low pressure line 135 to prevent the relief valve 193 from opening when the pressure connections are reversed.

What we claim as our invention and desire to secure by Letters Patent is:

1. The combination with an aircraft engine, a supercharger, and an exhaust-gas-operated turbine for driving said supercharger, of a valve for controlling the flow of exhaust gas to the turbine, a boost control device responsive to supercharging pressure, a servomotor associated with the boost control device, the piston of the servomotor being linked to the valve and normally operating to move the valve so as progressively to increase the flow of exhaust gas to the turbine with increase in altitude, a spring, normally overridden by the fluid pressure, for biassing the piston in the direction to reduce said flow, a relief valve, and a governor, operating on the relief valve, when the turbine attains a given critical speed, to cause said relief valve to reduce the fluid pressure acting on the piston in opposition to the spring.

2. Apparatus as claimed in claim 1, in which the relief valve is arranged to control a by-pass connection between the pressure and exhaust sides of the servo piston, the relief valve being normally maintained by a spring in position to restrict the flow of liquid through the by-pass but being displaced by the governor to open the by-pass when the turbine attains its critical speed.

3. Apparatus as claimed in claim 1, in which the relief valve is arranged to control the flow of fluid at one side of the servo piston, the relief valve moving under the control of the governor to check the fluid flow, when the turbine attains its critical speed.

4. The combination with an aircraft engine, a supercharger, and an exhaust-gas-operated turbine for driving said supercharger, of a valve for controlling the flow of exhaust gas to the turbine, a boost control device responsive to supercharging pressure, a servomotor associated with the boost control device, the piston of the servomotor being linked to the valve and normally operating to move the valve so as progressively to increase the flow of exhaust gas to the turbine with increase in altitude, a spring, normally overridden by the fluid pressure, for biassing the piston in the direction to reduce said flow, a by-pass pipe interconnecting the ends of the cylinder of the servomotor, said pipe containing two restrictions, a relief valve adapted, when in an operative position, to override the servomotor by reducing the pressure difference maintained across its piston by the boost control device, said relief valve being exposed at one end to the pressure prevailing in the portion of the by-pass pipe between said restrictions and being normally held by said pressure in an inoperative position, a valve controlling one of the restrictions and a governor linked to said valve and operating it, when the turbine attains a given critical speed, to vary the size of the restriction, thereby permitting the relief valve to move into an operative position and thereby prevent overspeeding of the turbine.

5. Apparatus as claimed in claim 4, in which the relief valve is arranged to move into an operative position on reduction in the pressure between the restrictions, the valve linked to the governor controlling the restriction nearest the high pressure line and serving to reduce the size of said restriction when the governor comes into operation.

6. Apparatus as claimed in claim 4, in which movement of the relief valve into an operative position, equalises or approximately equalises the fluid pressure on the two sides of the servo piston, a small leakage orifice being provided to permit pressure fluid to flow from one side of the piston to the other.

7. The combination with an aircraft engine, a supercharger, and an exhaust-gas-operated turbine for driving said supercharger, of a valve for controlling the flow of exhaust gas to the turbine, a boost control device responsive to supercharging pressure, said boost control device being coupled to the valve and arranged, below a given critical height, to actuate the valve so as progressively to increase the flow of exhaust gas to the turbine with increasing altitude, a governor, responsive to turbine speed and adapted when a given critical speed is reached, to override the boost control device and control the valve so as to prevent overspeeding of the turbine, and a resetting piston, which is associated with the boost control device and inoperative below the critical height, said resetting piston serving, as altitude increases, progressively to reduce the rate of supply of fuel to the engine when the turbo-supercharger is no longer able to maintain the boost pressure at the required value.

8. The combination with an aircraft engine, an engine driven supercharger, an exhaust-gas-operated prime mover and a second supercharger driven thereby, of a throttle valve for controlling the engine, a valve for controlling the flow of exhaust gas to said prime mover, a boost control device responsive to supercharging pressure, a first hydraulic servomotor and a second hydraulic servomotor, connected in parallel with respect to the boost control device, the first servomotor serving to operate the throttle valve and the second servomotor to operate the exhaust gas valve independently of the throttle valve and only after the first servomotor has fully opened the throttle valve, said servomotors acting successively and independently on their associated valves to maintain the boost pressure at a value selected by the boost control device, and a governor, responsive to turbine speed and arranged, when a predetermined critical speed is reached, to vary the hydraulic pressure drop across said second servomotor and thereby to adjust the exhaust gas valve so as to prevent overspeeding of the turbine.

9. The combination with an aircraft engine, an engine-driven supercharger, an exhaust-gas-operated turbine and a turbo-supercharger driven thereby, of a throttle valve for controlling the engine, a valve for controlling the flow of exhaust gas to the turbine, a boost control device responsive to supercharging pressure, two servomotors connected in parallel with respect to the boost control device, the first servomotor being coupled to the throttle valve, and the second servomotor being coupled to the exhaust gas valve, biassing springs associated with the pistons of the two servomotors and tending to maintain the pistons in the ground level position, the spring of the second servomotor normally operating to prevent the flow of exhaust gas to the turbine, and being overpowered by the fluid pressure to permit of a progressively increasing flow of exhaust gas to the turbine with increasing altitude only after the piston of the first servomotor has moved against its spring to the limit of its travel, a governor responsive to turbine speed and adapted, when a predetermined critical speed is reached, to override the second servomotor and control the exhaust gas valve so as to prevent overspeeding of the turbine, a resetting piston associated with said boost control device and serving to progressively reduce, with increase in altitude, the supply of fuel to the engine, when the turbo-supercharger is no longer able to maintain the boost pressure at the required value, and a biassing spring for normally maintaining the resetting piston in an inoperative position, said biassing spring being stronger than the spring associated with the piston of the second servomotor and being overpowered by the fluid pressure only when said servo piston has moved against its spring to the maximum permitted extent.

10. The combination with an aircraft engine, an engine-driven supercharger, an exhaust-gas-operated turbine and a turbo-supercharger driven thereby, of a throttle valve for controlling the engine, a valve for controlling the flow of exhaust gas to the turbine, a boost control device responsive to supercharging pressure, two servomotors connected in parallel with respect to the boost control device, the first servomotor being coupled to the throttle valve, and the second servomotor being coupled to the exhaust gas valve, biassing springs associated with the pistons of the two-servomotors and tending to maintain the pistons in the ground level position, the spring of the second servomotor normally operating to prevent the flow of exhaust gas to the turbine, and being overpowered by the fluid pressure to permit of a progressively increasing flow of exhaust gas to the turbine with increasing altitude only after the piston of the first servomotor has moved against its spring to the limit of its travel, a governor responsive to turbine speed and adapted, when a predetermined critical speed is reached, to override the second servomotor and control the exhaust gas valve so as to prevent overspeeding of the turbine, a resetting piston associated with said boost control device and serving to progressively reduce, with increase in altitude, the supply of fuel to the engine, when the turbo-supercharger is no longer able to maintain the boost pressure at the required value, a biassing spring for normally maintaining the resetting piston in an inoperative position, said biassing spring being stronger than the spring associated with the piston of the second servomotor and being overpowered by the fluid pressure only when said servo piston has moved against its spring to the maximum permitted extent, a pilot's throttle lever, a cam operated thereby for varying the datum of the boost control device, a cross link operatively connected at one end to the cam and at the other end to the resetting piston, a fuel-metering valve, and a rod joining the fuel-metering valve and the pressure-sensitive member of the boost control member, said rod being connected to the cross link intermediately between the ends thereof.

PHILIP HAROLD STOKES.
LEONARD SIDNEY GREENLAND.
CYRIL ALPHONSO PUGH.

REFERENCES CITED

The following references are of record in the file of this patent:

UNITED STATES PATENTS

| Number | Name | Date |
|---|---|---|
| 941,426 | Loudon | Nov. 30, 1909 |
| 1,835,686 | Allan et al. | Dec. 8, 1931 |
| 2,167,501 | Freeman et al. | July 25, 1939 |
| 2,285,344 | Marples | June 2, 1942 |
| 2,297,235 | Müller | Sept. 29, 1942 |
| 2,305,810 | Müller | Dec. 22, 1042 |

FOREIGN PATENTS

| Number | Country | Date |
|---|---|---|
| 479,278 | Great Britain | Jan. 28, 1938 |
| 511,826 | Great Britain | Aug. 24, 1939 |